(12) United States Patent
Sirak et al.

(10) Patent No.: US 11,359,042 B2
(45) Date of Patent: Jun. 14, 2022

(54) ANTIWEAR COPOLYMERS AND LUBRICANT COMPOSITIONS

(71) Applicant: Evonik Operations GmbH, Essen (DE)

(72) Inventors: Sofia Sirak, Ptymouth Meeting, PA (US); Dmitriy Shakhvorostov, Darmstadt (DE); Ines Berwing, Gross-Umstadt (DE); Denise Bingel, Frankfurt (DE)

(73) Assignee: Evonik Operations GmbH, Essen (DE)

( * ) Notice: Subject to any disclaimer, the term of this patent is extended or adjusted under 35 U.S.C. 154(b) by 514 days.

(21) Appl. No.: 16/302,228

(22) PCT Filed: May 17, 2017

(86) PCT No.: PCT/EP2017/061847
§ 371 (c)(1),
(2) Date: Nov. 16, 2018

(87) PCT Pub. No.: WO2017/198714
PCT Pub. Date: Nov. 23, 2017

(65) Prior Publication Data
US 2020/0262953 A1    Aug. 20, 2020

Related U.S. Application Data

(60) Provisional application No. 62/338,101, filed on May 18, 2016.

(30) Foreign Application Priority Data

May 31, 2016 (EP) .................................... 16172136

(51) Int. Cl.
*C10M 145/14*    (2006.01)
*C08F 218/10*    (2006.01)
(Continued)

(52) U.S. Cl.
CPC .......... *C08F 218/10* (2013.01); *C08F 210/14* (2013.01); *C08F 220/18* (2013.01);
(Continued)

(58) Field of Classification Search
CPC .... C08F 218/10; C08F 210/14; C08F 220/18; C10M 145/08; C10M 145/14;
(Continued)

(56) References Cited

U.S. PATENT DOCUMENTS 8,722,600 B2    5/2014  Scherer et al.
2005/0101496 A1    5/2005  Loper et al.
(Continued)

FOREIGN PATENT DOCUMENTS

EP    1 531 176 A2    5/2005
EP    1 633 793        3/2006
(Continued)

OTHER PUBLICATIONS

International Search Report and Written Opinion dated Aug. 3, 2017 in PCT/EP2017/061847 filed on May 17, 2017.

*Primary Examiner* — Prem C Singh
*Assistant Examiner* — Francis C Campanell
(74) *Attorney, Agent, or Firm* — Oblon, McClelland, Maier & Neustadt, L.L.P.

(57) ABSTRACT

The present invention relates to copolymers, to a method for the preparation of these copolymers, to the use of these copolymers for reducing wear in a lubricant composition, to lubricant compositions comprising these copolymers, and to the use of these lubricant compositions as an automatic transmission fluid, a continuously variable transmission fluid, an engine oil, a gear oil, or a hydraulic oil.

16 Claims, 5 Drawing Sheets

(51) Int. Cl.
*C08F 210/14* (2006.01)
*C10M 143/08* (2006.01)
*C10M 145/08* (2006.01)
*C08F 220/18* (2006.01)
*C10N 40/25* (2006.01)
*C10N 20/02* (2006.01)
*C10N 20/04* (2006.01)
*C10N 30/06* (2006.01)
*C10N 40/04* (2006.01)
*C10N 40/08* (2006.01)

(52) U.S. Cl.
CPC ........ *C10M 143/08* (2013.01); *C10M 145/08* (2013.01); *C10M 145/14* (2013.01); *C10M 2205/028* (2013.01); *C10M 2209/062* (2013.01); *C10M 2209/084* (2013.01); *C10N 2020/02* (2013.01); *C10N 2020/04* (2013.01); *C10N 2030/06* (2013.01); *C10N 2040/042* (2020.05); *C10N 2040/045* (2020.05); *C10N 2040/08* (2013.01); *C10N 2040/25* (2013.01)

(58) Field of Classification Search
CPC .......... C10M 143/08; C10M 2209/084; C10M 2205/028; C10M 2209/062; C10N 2020/02; C10N 2030/06; C10N 2040/045; C10N 2020/04
USPC ....................................................... 508/469
See application file for complete search history.

(56) References Cited

U.S. PATENT DOCUMENTS

| 2006/0142168 | A1  | 6/2006  | Kinker et al. |
| 2007/0184993 | A1* | 8/2007  | Scherer ................. C08F 265/06 508/465 |
| 2007/0197409 | A1* | 8/2007  | Scherer ................. C10M 161/00 508/469 |
| 2009/0270287 | A1  | 10/2009 | Kinker et al. |
| 2012/0264662 | A1  | 10/2012 | Dibiase et al. |
| 2014/0113847 | A1  | 4/2014  | Givens et al. |
| 2014/0274843 | A1  | 9/2014  | Tindall et al. |
| 2014/0274844 | A1  | 9/2014  | Rizvi et al. |

FOREIGN PATENT DOCUMENTS

| JP | 48-56613 A      | 8/1973  |
| JP | 2005-248157 A   | 9/2005  |
| JP | 2007-532703 A   | 11/2007 |
| WO | WO 2004/113403 A1 | 12/2004 |
| WO | WO 2006/066649 A2 | 6/2006  |

* cited by examiner

ANTIWEAR COPOLYMERS AND LUBRICANT COMPOSITIONS

FIELD OF THE INVENTION

The present invention relates to copolymers, to a method for the preparation of these copolymers, to the use of these copolymers for reducing wear in a lubricant composition, to lubricant compositions comprising these copolymers, and to the use of these lubricant compositions as an automatic transmission fluid, a continuously variable transmission fluid, an engine oil, a gear oil, or a hydraulic oil.

STATE OF THE ART

Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, and metalworking oils.

A typical lubricant composition includes a base oil and optionally one or more additives. Conventional base oils are hydrocarbons, such as mineral oils. A wide variety of additives may be combined with the base oil, depending on the intended use of the lubricant. Examples of lubricant additives include, but are not limited to, oxidation inhibitors, corrosion inhibitors, dispersing agents, high pressure additives, anti-foaming agents and metal deactivators.

The physical and chemical properties of a lubricant are affected by the chemical structures of the various components of the lubricant, the relative amounts of the components in the lubricant, and the processing techniques used to form the lubricant. For example, the chemical structure of the base oil may determine overall ranges of physical and chemical properties of the lubricant, with the specific properties being affected by the other components of the lubricant composition and/or the manner in which the lubricant composition is prepared. Alteration of the chemical structure of the base oil can allow for modification of the overall range of properties of a lubricant containing the base oil.

Lubricant compositions for use as, for example, engine or gear oils are commonly supplemented with auxiliary additives to improve their viscosimetric properties. Of particular importance is the improvement of the viscosity index, which measures the temperature dependence of the lubricant composition. A high viscosity index indicates little variation of the viscosity over a given temperature range. A lubricant composition with a high viscosity index will, therefore, have an appropriate viscosity during the cold-start phase of an engine as well as when the engine has reached its operating temperature. This improves the fuel efficiency of the engine, since the lubricant can reduce friction loss even during the cold-start phase.

Polyalkyl acrylates are common polymeric additives for lubricant oil compositions. Long alkyl chains (typical chain length: C8-C18) in the ester functionalities of the acrylate monomers impart a good solubility in apolar solvents, for example mineral oil, to polyalkyl acrylates. Common fields of use of the additives are hydraulic, gearbox or engine oils. A viscosity index (VI)-optimizing action is attributed to the polymers, from where the name VI improvers originates. A high viscosity index means that an oil possesses a relatively high viscosity at high temperatures (for example in a typical range of 70° C. to 140° C.) and a relatively low viscosity at low temperatures (for example in a typical range of −60° C. to 20° C.). The improved lubricity of an oil at high temperatures compared to a non-polyacrylate-containing oil which has an otherwise identical kinematic viscosity at, for example, 40° C. is caused by a higher viscosity in the increased temperature range. At the same time, in the case of utilization of a VI improver at relatively low temperature, as is present, for example, during the cold-start phase of an engine, a lower viscosity is recorded in comparison to an oil which otherwise has an identical kinematic viscosity at 100° C. As a result of the lower viscosity of the oil during the start-up phase of an engine, a cold start is thus eased substantially.

In recent times, polyacrylate systems which, as well as VI optimization, provide additional properties, for example dispersancy, have become established in the lubricants industry. Either alone or together with dispersant-inhibitor (DI) additives used specifically for dispersion purposes, such polymers have the effect, inter alia, that the oxidation products occurring as a result of stress on the oil contribute less to a disadvantageous viscosity rise. By means of improved dispersibility, the lifetime of a lubricant oil can be extended. By virtue of their detergent action, such additives likewise have the effect that the engine cleanliness, for example expressed by the piston cleanliness or ring sticking, is influenced positively. Oxidation products are, for example, soot or sludge. In order to impart dispersancy to polyacrylates, nitrogen-containing functionalities may be incorporated into the side chains of the polymers. A further class of monomer types which should be mentioned owing to their dispersancy in lubricants is that of acrylates with ethoxylate- or propoxylate-containing functions in the ester substituents. The dispersible monomers may be present either randomly in the polymer, i.e. are incorporated into the polymer in a classical copolymerization, or else grafted onto a polyacrylate, which results in systems with a non-random structure.

To date there has been no targeted research for polyalkyl (meth)acrylates which, as well as the known advantages in relation to dispersancy and VI improvement, also offer advantages in relation to wear reduction, i.e. have antiwear properties.

EP 1 633 793 B1 describes functionalized polyalpha-olefins where an alpha-olefin monomer containing at least 10 carbon atoms is copolymerized with an alpha-olefin containing a functional group. These polyalpha-olefins are said to be useful for their increased solubility in various solvents.

US 2014/0274843 A1, US 2014/0274844 A1 and US 2012/0245063 A1 describe copolymers of alpha-olefins with alpha-olefins having a terminal functional group. The copolymers described are said to have low viscosities and to be useful as lubricants. In particular, US 2014/0274844 A1 discloses lubricating compositions comprising a copolymer of alpha-olefin and omega unsaturated acid esters. The copolymers provides improved viscosity performance at low and high temperatures and improved thermo-oxidative stability. No mention is made to anti-wear properties.

EP 1531176 discloses lubricating compositions comprising a dispersant which provides improved engine performance and anti-wear properties. The dispersant is a hydrocarbyl substituted amine-containing compound.

U.S. Pat. No. 8,349,779 B2 describes polymers with H-bond donor functionalities that are useful as supplements in lubricant compositions. The functional groups are added by grafting the polymer backbone after polymerization with functional group bearing monomers. The grafting step limits the amount of functionality that can be added to the polymer, and grafting location and density cannot be controlled. Furthermore, viscosity is not easily controlled with grafting techniques.

It was therefore an object of the present invention to provide copolymers which, in lubricant oil compositions, are notable not only for their viscosity index (VI) action, but also for their dispersancy and/or detergency, and for their positive influence on wear behavior.

SUMMARY OF THE INVENTION

These objects, and also further objects which are not stated explicitly but which can be derived or discerned directly from the connections discussed by way of introduction herein are achieved by a copolymer comprising:
a) 0.1 wt.-% to 20 wt.-% of units derived from one or more compounds of formula (I), based on the total weight of the copolymer,

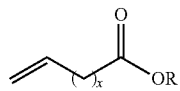
(I)

wherein R=H or $C_nH_{2n+1}$ (n=1 to 6) and x=6 to 10, and
b) 60 wt.-% to 99.9 wt.-% of units derived from one or more alkyl (meth)acrylates, based on the total weight of the copolymer, wherein the alkyl group has from 1 to 40 carbon atoms.

Advantages of the Invention

It was surprisingly found that copolymers comprising one unit or more than one unit derived from compounds of formula (I) with their terminal acid or ester functionality provide for improved wear performance when added to a lubricant composition. By employing alkyl spacers between the functional group and the polymer backbone, high performance is achieved with low degree of functionalization, i.e. less monomer is needed to achieve the desired wear performance.

The copolymerization to obtain these copolymers is much easier compared to preparation techniques requiring a grafting step, high amounts of initiators and/or long reaction times.

In contrast to the prior art polyalpha-olefins, the copolymers of the present invention can be prepared at higher molecular weights and higher viscosities. Furthermore, copolymerization reaction can be well controlled.

DETAILED DESCRIPTION OF THE INVENTION

Figure 1:
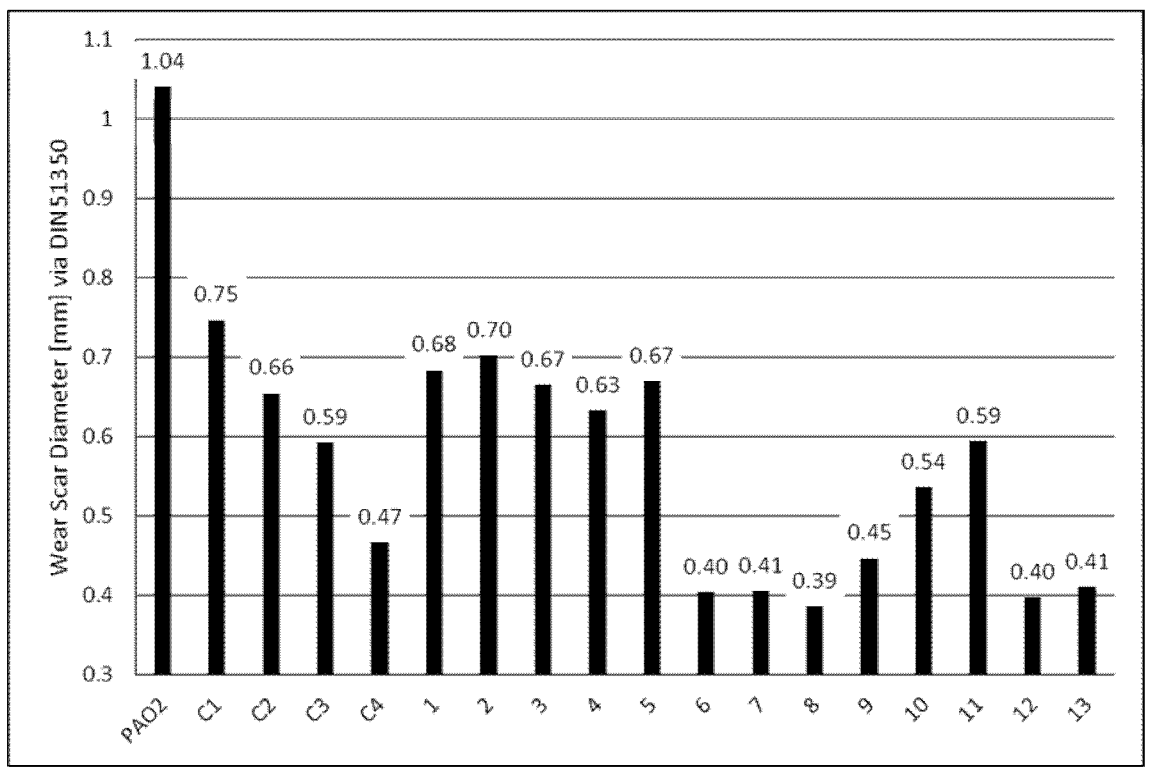
FIG. 1 is a bar chart comparing the average wear scar diameters of the copolymers according to the invention and of the comparative polymers.

The copolymers of the invention contain, as one component, 0.1 wt.-% to 20 wt.-% of units derived from one or more compounds of formula (I)

(I)

wherein R=H or $C_nH_{2n+1}$ (n=1 to 6) and x=6 to 10. These compounds are widely known and include e.g. 8-nonenoic acid, methyl 8-nonenoate, 9-decenoic acid, methyl 9-decenoate, 10-undecenoic acid, methyl 10-undecenoate, 11-dodecenoic acid, methyl 11-dodecenoate, 12-tridecenoic acid, methyl 12-tridecenoate.

According to one aspect of the invention, it is preferred that in the units derived from one or more compounds of formula (I) R=H or $CH_3$, more preferably R=H.

According to another aspect of the invention, it is preferred that in the units derived from one or more compounds of formula (I) x=8.

The copolymers of the invention contain, as further component, 60 wt.-% to 99.9 wt.-% of units derived from one or more alkyl (meth)acrylates, wherein the alkyl group has from 1 to 40 carbon atoms.

The term alkyl (meth)acrylates includes alkyl methacrylates and alkyl acrylates as well as mixtures thereof. These monomers are well known in the art. The alkyl residue of the ester compounds can be linear, cyclic or branched. The alkyl residue has 1 to 40, preferably 5 to 30 and more preferably 7 to 15 carbon atoms. The monomers can be used individually or as mixtures of different alkyl (meth)acrylate monomers.

According to an aspect of the present invention, the units derived from one or more alkyl (meth)acrylates may comprise units being derived from one or more alkyl (meth) acrylate monomers of formula (II)

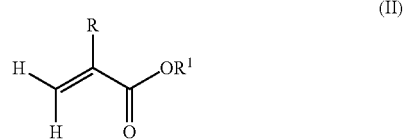
(II)

where R is hydrogen or methyl, $R^1$ means a linear, branched or cyclic alkyl residue with 1 to 6 carbon atoms, preferably 1 to 5, more preferably 1 to 3 carbon atoms.

Examples of monomers according to formula (II) are, among others, (meth)acrylates which derived from saturated alcohols such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate and hexyl (meth)acrylate; cycloalkyl (meth)

acrylates, like cyclopentyl (meth)acrylate and cyclohexyl (meth)acrylate. Preferably, the polymer comprises units being derived from methyl methacrylate.

The units derived from alkyl (meth)acrylates used according to the present invention may comprise 0% by weight to 40% by weight, preferably 0.1% by weight to 30% by weight, in particular 0.5% by weight to 20% by weight of units derived from one or more alkyl (meth)acrylate monomers of formula (II) based on the total weight of alkyl (meth)acrylates.

According to another aspect of the present invention, the units derived from one or more alkyl (meth)acrylates may comprise units being derived from one or more alkyl (meth)acrylate monomers of formula (III)

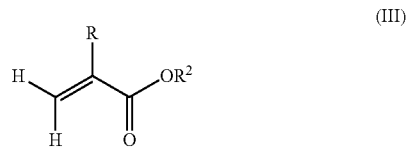

(III)

where R is hydrogen or methyl, $R^2$ means a linear, branched or cyclic alkyl residue with 7 to 15 carbon atoms.

Examples of component (III) include (meth)acrylates that derive from saturated alcohols, such as 2-ethylhexyl (meth)acrylate, heptyl (meth)acrylate, 2-tert-butylheptyl (meth)acrylate, n-octyl (meth)acrylate, 3-isopropylheptyl (meth)acrylate, nonyl (meth)acrylate, decyl (meth)acrylate, isodecyl (meth)acrylate, undecyl (meth)acrylate, 5-methylundecyl (meth)acrylate, n-dodecyl (meth)acrylate, 2-methyldodecyl (meth)acrylate, tridecyl (meth)acrylate, 5-methyltridecyl (meth)acrylate, n-tetradecyl (meth)acrylate, pentadecyl (meth)acrylate; (meth)acrylates which derive from unsaturated alcohols, for example oleyl (meth)acrylate; cycloalkyl (meth)acrylates such as cyclohexyl (meth)acrylate having a ring substituent, like tert-butylcyclohexyl (meth)acrylate and trimethylcyclohexyl (meth)acrylate, bornyl (meth)acrylate and isobornyl (meth)acrylate.

The units derived from alkyl (meth)acrylates used according to the present invention may comprise at least 10% by weight, especially at least 20% by weight of units derived from one or more alkyl(meth)acrylates of formula (III) based on the total weight of the alkyl (meth)acrylates. According to a preferred aspect of the present invention, the units derived from alkyl (meth)acrylates comprise about 25% by weight to 100% by weight, more preferably about 70% by weight to 100% by weight of units derived from monomers according to formula (III) based on the total weight of alkyl (meth)acrylates.

Furthermore, the units derived from one or more alkyl (meth)acrylates may comprise units being derived from one or more alkyl (meth)acrylate monomers of formula (IV)

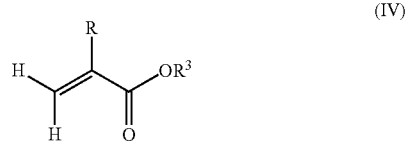

(IV)

where R is hydrogen or methyl, $R^3$ means a linear, branched or cyclic alkyl residue with 16-40 carbon atoms, preferably 16 to 30 carbon atoms.

Examples of component (IV) include (meth)acrylates which derive from saturated alcohols, such as hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; cycloalkyl (meth)acrylates such as 2,4,5-tri-t-butyl-3-vinylcyclohexyl (meth)acrylate, 2,3,4,5-tetra-t-butylcyclohexyl (meth)acrylate.

The units derived from alkyl (meth)acrylates used according to the present invention may comprise 0% by weight to 40% by weight, preferably 0.1% by weight to 30% by weight, in particular 0.5% by weight to 20% by weight of units derived from one or more alkyl (meth)acrylate monomers of formula (IV) based on the total weight of the alkyl (meth)acrylates.

According to another preferred aspect of the invention, the units derived from one or more alkyl (meth)acrylates comprise (i) 0 to 40% by weight, based on the total weight of alkyl (meth)acrylates, of units derived from one or more alkyl (meth)acrylate monomers of formula (II)

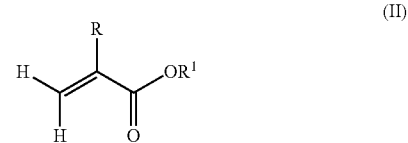

(II)

where R is hydrogen or methyl, $R^1$ means a linear, branched or cyclic alkyl residue with 1 to 6 carbon atoms,
and (ii) at least 10% by weight, based on the total weight of alkyl (meth)acrylates, of units derived from one or more alkyl (meth)acrylate monomers of formula (III)

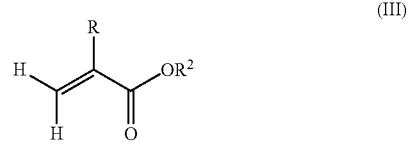

(III)

where R is hydrogen or methyl, $R^2$ means a linear, branched or cyclic alkyl residue with 7 to 15 carbon atoms,
and (iii) 0 to 40% by weight, based on the total weight of alkyl (meth)acrylates, of units derived from one or more alkyl (meth)acrylate monomers of formula (IV)

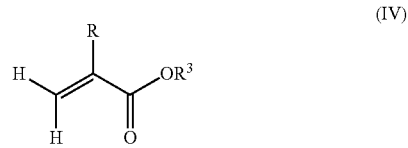

(IV)

where R is hydrogen or methyl, $R^3$ means a linear, branched or cyclic alkyl residue with 16-40 carbon atoms.

According to a further preferred aspect of the invention, the units derived from one or more alkyl (meth)acrylates comprise at least two different units derived from one or more alkyl (meth)acrylate monomers of formula (III)

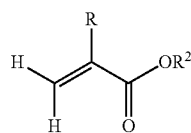
(III)

where R is hydrogen or methyl, $R^2$ means a linear, branched or cyclic alkyl residue with 7 to 15 carbon atoms.

The copolymers of the invention contain, as optional component, units derived from one or more non-functionalized alpha-olefins of formula $C_nH_{2n}$ with n=8 to 12, preferably with n=10. These compounds are widely known and include e.g. 1-octene, 1-nonene, 1-decene, 1-undecene, 1-dodecene.

According to the present invention, the copolymer comprises the units derived from one or more compounds of formula (I) in a total amount of 0.1 wt.-% to 20 wt.-%, more preferably 0.5 wt.-% to 20 wt.-%, based on the total weight of the copolymer.

According to the present invention, the copolymer comprises the units derived from one or more alkyl (meth)acrylates in a total amount of 60 wt.-% to 99.9 wt.-%, more preferably 60 wt.-% to 97 wt.-%, based on the total weight of the copolymer.

According to a preferred aspect of the present invention, the copolymer comprises units derived from one or more non-functionalized alpha-olefins of formula $C_nH_{2n}$ with n=8 to 12 in an amount of 0.5 wt.-% to 40 wt.-%, preferably 0.5 wt.-% to 30 wt.-%, more preferably 3 wt.-% to 30 wt.-%, based on the total weight of the copolymer.

The process for preparing a copolymer of the invention comprises the step of copolymerizing a mixture of monomers, the monomer mixture comprising a. one or more compounds of formula (I)

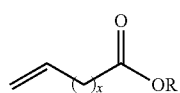
(I)

wherein R=H or $C_nH_{2n+1}$ (n=1 to 6) and x=6 to 10,
b. one or more alkyl (meth)acrylates, wherein the alkyl group has from 1 to 40 carbon atoms, and optionally
c. one or more non-functionalized alpha-olefins of formula $C_nH_{2n}$ with n=8 to 12.

The present invention also relates to a lubricant composition comprising a copolymer as described herein.

According to a preferred aspect of the present invention, the lubricant composition comprises 0.01 wt.-% to 50 wt.-% of the inventive copolymer, more preferably 0.05 wt.-% to 40 wt.-%, even more preferably 2 wt.-% to 15 wt.-%, most preferably 4 wt.-% to 12 wt.-%, based on the total weight of the lubricant composition.

Preferably, the lubricant composition comprises a base oil. The base oils used in formulating the improved lubricating oil compositions of the present invention include, for example, conventional base stocks selected from API (American Petroleum Institute) base stock categories known as Group I, Group II and Group III. The Group I and II base stocks are mineral oil materials (such as paraffinic and naphthenic oils) having a viscosity index (or VI) of less than 120; Group I is further differentiated from Group II in that the latter contains greater than 90% saturated materials and the former contains less than 90% saturated material (that is more than 10% unsaturated material). Group III is considered the highest level of mineral base oil with a VI of greater than or equal to 120 and a saturates level greater than or equal to 90%. Preferably the base oil included in the lubricating oil composition of the present invention is selected from the group consisting of API Group II and III base oils. Most preferably, the lubricant composition comprises an API Group III base oil.

The present invention further relates to the use of a copolymer as described herein for reducing wear in a lubricant composition, and to the use of a lubricant composition comprising a polymer as described herein as an automatic transmission fluid, a continuously variable transmission fluid, an engine oil, a gear oil, or a hydraulic oil.

The present invention is further illustrated by the following non-limiting examples.

Example 1

70 gram of methyl-10-undecenoate and 137 grams of 1-decene were charged into a 1 L 4-necked round bottom flask. The reaction mixture was stirred using a C-stirring rod, inerted with nitrogen, and heated to 140° C. A monomer feed included 493 grams C12-C15 methacrylates. The initiator feed was 9.4 g of 2,2-bis(t-butylperoxy) butane. Once the mixture reached the set point temperature, a 7 hour straight monomer feed and 11 hour straight initiator feed was started. Residual monomer was measured by gas chromatography on the resultant polymers to ensure full monomer conversion. Residual amounts of unreacted alpha olefin monomer were removed by via rotary evaporation at 100° C. and less than 15 mm Hg pressure.

Examples 2-13

Examples 2-13 were prepared in the same way as example 1, except that the weight ratio of monomers was changed according to table 1. The alpha-olefin monomers are always first charged to the reactor and the (meth)acrylate monomers and the initiator were fed over a set period of time. Molecular weight and kinematic viscosity can be controlled using various monomer & initiator feed times or by using a larger fraction of alpha olefin in the reaction mixture. For example, Examples 6 and 13 have the same reaction mixture. By changing the monomer feed time from 7 hours (Example 6) to 5 hours (Example 13), the kinematic viscosity increases from 206 cSt to 321 cSt and this is also reflected in the change in weight average molecular weight from 9400 g/mol to 14700 g/mol.

Figure 2:
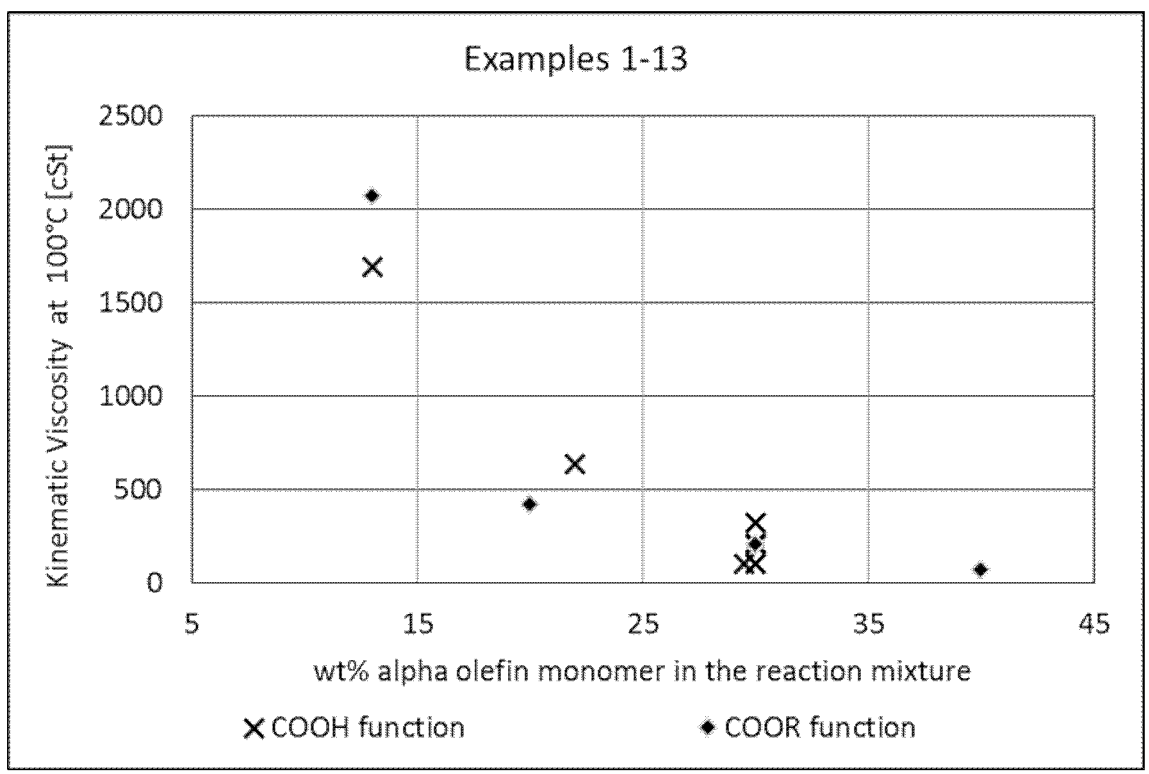
FIG. 2 shows the correlation between the olefin content and the kinematic viscosity of copolymers according to the invention.
Figure 3:
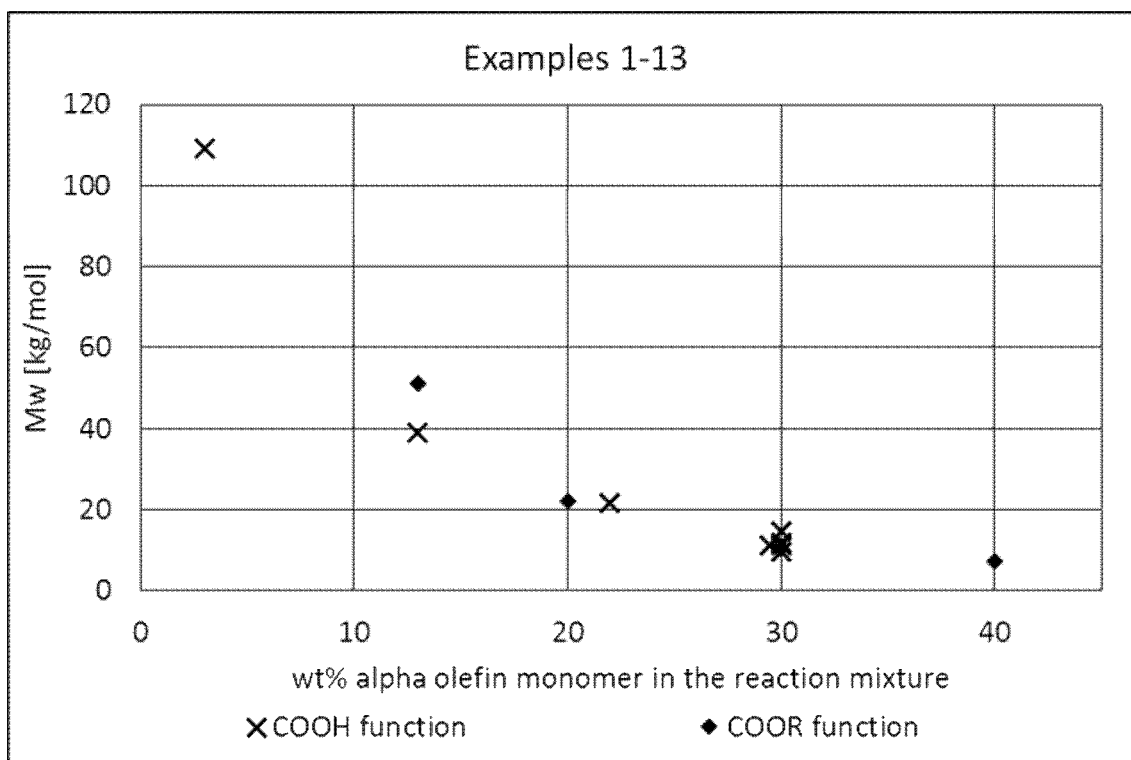
FIG. 3 shows the correlation between the olefin content and the weight average molecular weight of copolymers according to the invention.

The amount of alpha olefin in the reaction mixture also greatly influences molecular weight and kinematic viscosity. This is also depicted in FIGS. 2 and 3. With increased amount of alpha olefin in the reaction mixture, the weight average molecular weight and kinematic viscosity will decrease. This also illustrates the necessity to add methacrylate monomer in the composition so that the obtained polymer can provide thickening in the oil formulation.

Comparative Example 1

Comparative example 1 was prepared in the same was as example 1 except that the weight ratios or monomers were according to Table 1.

Comparative Example 2

Comparative example 2 is commercially available high viscosity Group IV base fluid (Synfluid® PAO100), which is a homopolymer of 1-decene.

Comparative Example 3

Comparative example 3 was made according to U.S. Pat. No. 8,349,779 B2 using glacial methacrylic acid, which is a monomer that has the COOH acid group, but does not have an alkyl spacer between the methacrylate group.

Comparative Example 4

Comparative example 4 was made according to example 6 in US 2012/0245063 A1.

The kinematic viscosities of the polymers were measured according to ASTM D 445 with no deviations. The polymer weight average molecular weights were measured by gel permeation chromatography (GPC) calibrated using poly (methyl-methacrylate) standards. Tetrahydrofuran (THF) is used as eluent.

4-ball tests were performed according to DIN 51350—Part 5 at an applied force of 300 N. The setup used was as described in DIN 51350—Part 1. After the tests, wear scar was measured by digital camera and average results were calculated.

The polymer compositions and the corresponding test results are summarized in table 1.

TABLE 1

|  |  | Comp. Examples |  |  |  | Inventive Examples |  |  |  |
|---|---|---|---|---|---|---|---|---|---|
|  | PAO2 | C1 | C2 | C3 | C4 | 1 | 2 | 3 | 4 |
| 10-undecenoic acid [wt.-%] | reaction |  |  |  | 13 | 10 | 10 | 20 | 20 |
| methyl 10-undecenoate [wt.-%] | mixture |  |  |  |  |  |  |  |  |
| 1-decene [wt.-%] |  | 30 | 100 | 27 | 87 | 20 | 3 | 10 |  |
| methacrylic acid [wt.-%] |  | 39 |  | 339 |  | 39 | 48 | 39 | 44 |
| % C12-C15 MA (LIMA) [wt.-%] |  |  |  |  |  |  |  |  |  |
| % isoC10 MA (IDMA) [wt.-%] |  | 31 |  | 31 |  | 31 | 39 | 31 | 36 |
| Total alpha olefin [wt.-%] |  | 30 | 100 | 27 | 100 | 30 | 13 | 30 | 20 |
| Total alkyl methacrylate [wt.-%] |  | 70 | 0 | 73 | 0 | 70 | 87 | 70 | 80 |
| Monomer Feed Time [hr] |  | 7 |  |  |  | 7 | 5 | 7 | 7 |
| Initiator Feed time [hr] |  | 11 |  |  |  | 11 | 7 | 11 | 11 |
| Mw [kg/mol] |  | 9.0 | 7.7 | 13.3 | 2.2 | 10.4 | 51.1 | 10.7 | 22.0 |
| Kinematic Viscosity @ 100° C. [cSt] | 2 | 140 | 100 | 765 | 16.6 | 199 | 2071 | 209 | 423 |
| Kinematic Viscosity @ 100° C. [cSt], 30 wt % polymer in Group I* mixture |  | 12.6 | 14.2 | 18.1 | 7.6 | 13.8 | 35.2 | 13.8 | 17.8 |
| Viscosity Index |  | 136 | 139 | 123 | 121 | 138 | 180 | 138 | 151 |
| Wear scar diameter DIN 51350, 2% in PAO2** [mm] | 1.04 | 0.75 | 0.66 | 0.59 | 0.47 | 0.68 | 0.70 | 0.67 | 0.63 |

|  | Inventive Examples |  |  |  |  |  |  |  |  |
|---|---|---|---|---|---|---|---|---|---|
|  | 5 | 6 | 7 | 8 | 9 | 10 | 11 | 12 | 13 |
| 10-undecenoic acid [wt.-%] | 10 | 3 | 3 | 5 | 3 | 1 | 0.5 | 3 | 3 |
| methyl 10-undecenoate [wt.-%] |  |  |  |  |  |  |  |  |  |
| 1-decene [wt.-%] | 30 | 27 | 10 | 25 |  | 29 | 29 | 19 | 27 |
| methacrylic acid [wt.-%] | 33 | 39 | 48 | 39 | 53 | 39 | 39.2 | 43 | 39 |
| % C12-C15 MA (LIMA) [wt.-%] |  |  |  |  |  |  |  |  |  |
| % isoC10 MA (IDMA) [wt.-%] | 27 | 31 | 39 | 31 | 44 | 31 | 31.3 | 35 | 31 |
| Total alpha olefin [wt.-%] | 40 | 30 | 13 | 30 | 3 | 30 | 29.5 | 22 | 30 |
| Total alkyl methacrylate [wt.-%] | 60 | 70 | 87 | 70 | 97 | 70 | 70.5 | 78 | 70 |
| Monomer Feed Time [hr] | 7 | 7 | 5 | 7 | 7 | 7 | 7 | 5 | 5 |
| Initiator Feed time [hr] | 11 | 11 | 7 | 11 | 11 | 11 | 11 | 7 | 7 |
| Mw [kg/mol] | 7.3 | 9.4 | 38.8 | 11.7 | 109.0 | 11.1 | 11.0 | 21.7 | 14.7 |
| Kinematic Viscosity @ 100° C. [cSt] | 73 | 206 | 1694 | 215 | >5000 | 104 | 104 | 637 | 321 |
| Kinematic Viscosity @ 100° C. [cSt], 30 wt % polymer in Group I* mixture | 10.4 | 14.0 | 30.8 | 14.3 | 58.3 | 13.9 | 13.9 | 20.9 | 16.5 |
| Viscosity Index | 132 | 130 | 157 | 127 | 191 | 134 | 134 | 144 | 129 |
| Wear scar diameter DIN 51350, 2% in PAO2** [mm] | 0.67 | 0.40 | 0.41 | 0.39 | 0.45 | 0.54 | 0.59 | 0.40 | 0.41 |

Total alpha olefin content is equal to the sum of 1-decene, 10-undecenoic acid, and methyl 10-undecenoate in each reaction mixture. Total alkyl methacrylate content is equal to the sum of LIMA and IDMA in each reaction mixture.
*Kinematic viscosity at 100° C. (KV100) of the Group I base oil is 5.4 cSt. Example polymers were blended at 30 wt % in Group I mixture to demonstrate thickening efficiency of the polymer.
**for the 4-ball wear test, polymers were added at 2 weight percent in PAO2

Abbreviations cSt=centistokes
AMA=alkyl methacrylates
PAO=polyalphaolefin
IDMA=isodecyl methacrylate
LIMA=methacrylate ester made from LIAL 125 alcohol
PAO2=Synfluid® PAO2 (commercially available low viscosity Group IV base oil, which is a 1-decene dimer)
PAO100=Synfluid® PAO100 (commercially available high viscosity Group IV base oil, which is a homopolymer of 1-decene)

Examples 1-13 demonstrate the improved wear performance of copolymers of the invention containing acid/ester end functional monomers. Performance is not negatively impacted by molecular weight or viscosity, as shown by the broad range in $M_w$ of 7.3 kg/mol to 109 kg/mol and 73 cSt to >5000 cSt. Wear scar diameter for PAO2 is 1.04 mm, and for examples 1-13 the wear scar diameter ranges from 0.39 mm to 0.7 mm.

Comparative example 1 is an alpha olefin-co-alkyl methacrylate copolymer that does not contain terminal functional COOR or COOH groups. Wear scar can be decreased with this polymer, but not as low as with the copolymers of the invention.

Comparative example 2 is a high viscosity group IV poly alphaolefin base fluid (PAO100). Again, wear scar can be decreased using this polymer but because no polar groups (for example, COOR ester groups) are present in the polymer, miscibility with certain basestocks and package components is limited. Furthermore, it is well known in the art that it is difficult to generate high viscosity or high molecular weight copolymers of 1-decene or similar alpha olefins. In contrast, it has been surprisingly found that the COOH functional polymers of the present invention achieve better wear scar results. Furthermore, the polymers of the present invention achieve comparable or even higher molecular weight and kinematic viscosity.

Comparative example 1 can be compared to examples 6-13. Here a portion of the non-functional group containing alpha olefin, 1-decene, in the reaction mixture is replaced with the COOH terminal functional alpha olefin. A dramatic increase in wear performance is now visible with the polymer of the present invention that contains the end functional monomer. Average wear scar can be decreased from 0.75 mm to 0.39 mm.

Comparative example 1 can also be compared to examples 1-5, which demonstrates the improved wear performance when adding an ester end-functional group. Average wear scar can be decreased from 0.75 mm to 0.63 mm.

The effect from the alkyl spacer between the COOR function and the backbone can also be shown by comparing comparative example 1 and example 5. The methacryate monomer portion of the polymer also contains ester functionality that can influence wear performance. In comparative example 1, ester functionality is included into the polymer by the 70% of the alkyl methacrylate monomer. In example 5, ester functionality from the methacrylate portion of the recipe is 60% and and additional 10% from the terminal functional alpha olefin. In this comparison, 10% of the ester functionality is moved from close the polymer backbone to the end of an alky spacer on the side chain. With this, wear scar decreases from 0.75 mm to 0.67 mm.

Comparison of comparative example 3 to examples 6, 7, 9, 12, and 13 shows that the use of a monomer with an alkyl spacer unit between the polymer backbone and the COOH functional group greatly increase wear performance. Comparative example 3 uses 3 wt.-% glacial methacrylic acid (GMAA), where the COOH group is directly connected to the polymer backbone. Examples 6, 7, 9, 12 and 13 use 3 wt.-%10-undecenoic acid, where the COOH group is on the terminal end of the olefin monomer thereby having 8 carbon spacer units between the polymer backbone and the functional group. Here the GMAA containing polymer shows antiwear performance, but not as well as the inventive polymer with the same amount of COOH functional monomer. Examples 10 and 11 have an even lower amount of 10-undecenoic acid, only 0.5 wt.-% and 1.0 wt.-%, and perform just as well (example 11) or better (example 10) than the GMAA-containing polymer.

Comparative Example 4 is copied from US 2012/0245063 A1. Although this polymer does have improved antiwear performance, the process to obtain this polymer involves using >20 wt.-% of initiator relative to the reaction mixture. It also shows very low viscosity and weight average molecular weight, and thus cannot be used as a viscosity improver because the kinematic viscosity of this polymer is only 16.6 cSt. This is further demonstrated by the addition of 30 wt.-% of this polymer in Group I base oil where the viscosity of the blend is only increased to 7.6 cSt from 5.4 cSt measured at 100° C. Furthermore, this polymer contains 13 wt.-% of the functional acid monomer, and still does not perform as well as the inventive polymers according to examples 6-9 and 12-13.

FIG. 1 is a bar chart showing average wear scar diameter for all examples. Wear scar tests were performed using a blend of 2 wt.-% of the sample in PAO2 group IV (polyalphaolefin) base fluid.

FIG. 2 illustrates the dependence on alpha olefin content in reaction mixture to kinematic viscosity at 100° C. An increased amount of alpha olefin in the reaction mixture lowers kinematic viscosity at 100° C. For these examples, the total alpha olefin content is equal to the sum of 1-decene, 10-undecenoic acid, and methyl 10-undecenoate in each reaction mixture.

FIG. 3 illustrates the dependence on alpha olefin content in reaction mixture to weight average molecular weight. An increased amount of alpha olefin in the reaction mixture lowers the weight average molecular weight.

Figure 4:
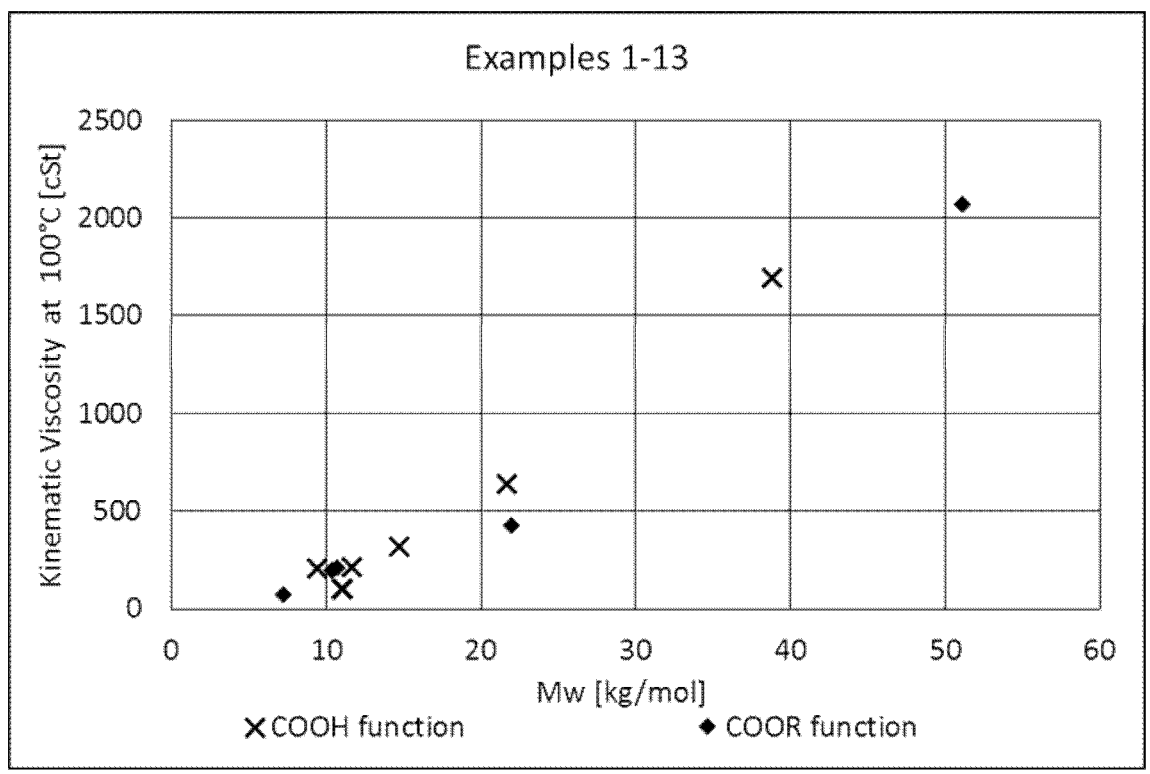
FIG. 4 shows the correlation between the weight average molecular weight and the kinematic viscosity of copolymers according the invention.

FIG. 4 shows the relationship between kinematic viscosity at 100° C. (KV 100) and weight average molecular weight.

Figure 5:
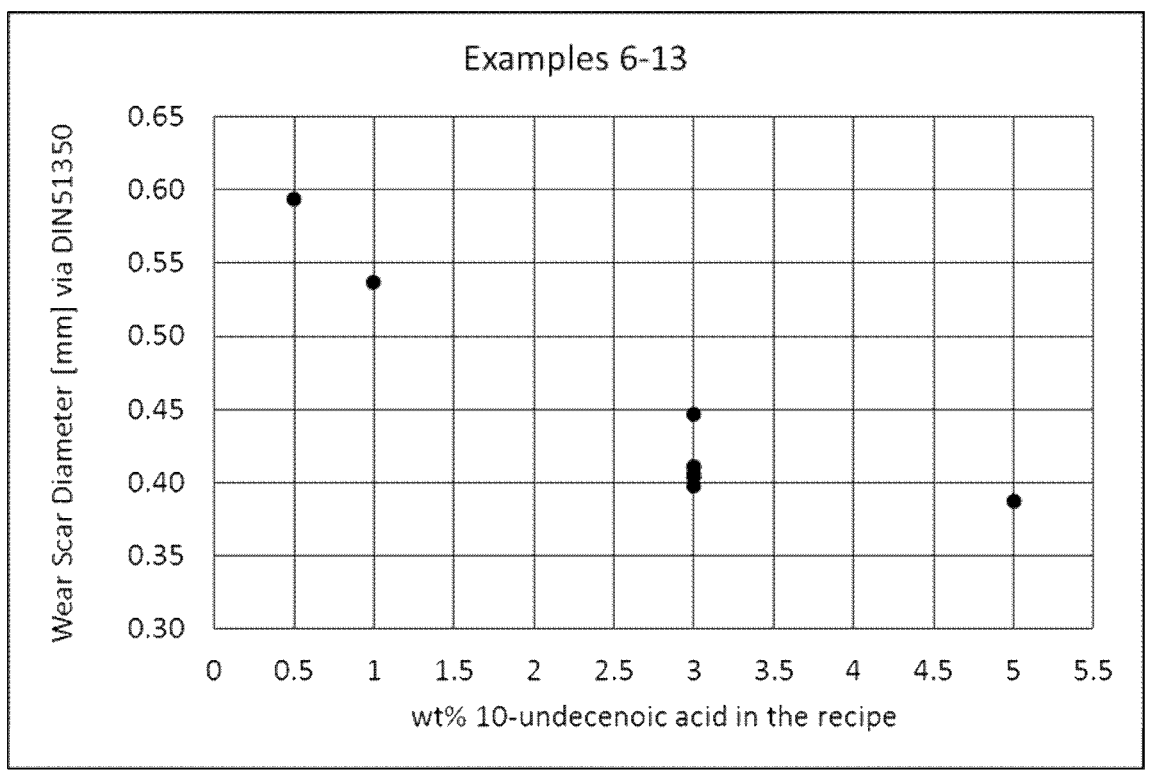
FIG. 5 shows the correlation between the 10-undecenoic acid content and the wear scar of copolymers according to the invention.

FIG. 5 illustrates the effect on reducing wear scar diameter by addition of the terminal functional monomer in the reaction mixture. An increased amount of 10-undecanoic acid in the reaction mixture reduces wear scar diameter.

The invention claimed is:
1. A copolymer, comprising:
a) 0.1 to 20 wt.-%, based on a total weight of the copolymer, of units derived from one or more compounds of formula (I)

wherein R is H or $C_nH_{2n+1}$, n=1 to 6, and x=6 to 10; and
b) 60 to 99.9 wt.-%, based on the total weight of the copolymer, of units derived from one or more alkyl (meth)acrylates, wherein each of the one or more alkyl (meth)acrylates independently has an alkyl group comprising 1 to 40 carbon atoms,
wherein the copolymer is not a graft copolymer.

2. The copolymer of claim 1, further comprising:
c) units derived from one or more non-functionalized alpha-olefins of formula $C_nH_{2n}$, wherein n=8 to 12.

3. The copolymer of claim 1, wherein R is H or $CH_3$.

4. The copolymer of claim 1, wherein x=8.

5. The copolymer of claim 1, comprising the units derived from the one or more compounds of formula (I) in a total amount of 0.5 to 20 wt.-%, based on the total weight of the copolymer.

6. The copolymer of claim 1, comprising the units derived from the one or more alkyl (meth)acrylates in a total amount of 60 to 97 wt.-%, based on the total weight of the copolymer.

7. The copolymer of claim 1, wherein the units derived from the one or more alkyl (meth)acrylates comprise:
(i) 0 to 40 wt.-%, based on a total weight of the one or more alkyl (meth)acrylates, of units derived from one or more alkyl (meth)acrylate monomers of formula (II)

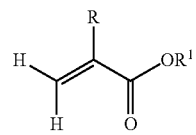

wherein R is H or $CH_3$ and $R^1$ is a linear, branched or cyclic alkyl residue with 1 to 6 carbon atoms, (ii) at least 10 wt.-%, based on the total weight of the one or more alkyl (meth)acrylates, of units derived from one or more alkyl (meth)acrylate monomers of formula (III)

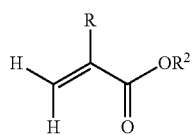

wherein R is H or $CH_3$ and $R^2$ is a linear, branched or cyclic alkyl residue with 7 to 15 carbon atoms, and (iii) 0 to 40 wt.-%, based on the total weight of the one or more alkyl (meth)acrylates, of units derived from one or more alkyl (meth)acrylate monomers of formula (IV)

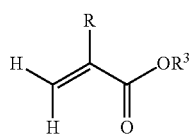

wherein R is H or $CH_3$ and $R^3$ is a linear, branched or cyclic alkyl residue with 16-40 carbon atoms.

8. The copolymer of claim 1, wherein the units derived from the one or more alkyl (meth)acrylates comprise at least two different units derived from one or more alkyl (meth)acrylate monomers of formula (III)

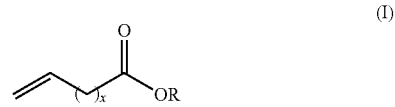

wherein R is H or $CH_3$ and $R^2$ is a linear, branched or cyclic alkyl residue with 7 to 15 carbon atoms.

9. The copolymer of claim 2, comprising the units derived from the one or more non-functionalized alpha-olefins in a total amount of 0.5 to 40 wt.-%, based on the total weight of the copolymer.

10. A method for preparing the copolymer of claim 1, the method comprising:
copolymerizing a mixture of monomers comprising:
a) one or more compounds of formula (I)

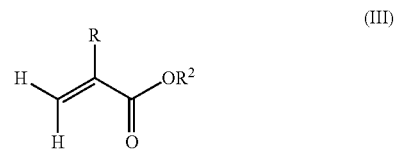

wherein R is H or $C_nCH_{2n+1}$, n=1 to 6, and x=6 to 10,
b) one or more alkyl (meth)acrylates, wherein each of the one or more alkyl (meth)acrylates independently has an alkyl group comprising 1 to 40 carbon atoms, and optionally
c) one or more non-functionalized alpha-olefins of formula $C_nH_{2n}$, wherein n=8 to 12.

11. A lubricant composition, comprising the copolymer of claim 1.

12. The lubricant composition of claim 11, comprising the copolymer in an amount of 0.01 to 50 wt.-%, based on a total weight of the lubricant composition.

13. A method for reducing wear of a surface, the method comprising contacting the surface with the lubricant composition of claim 11.

14. An automatic transmission fluid, a continuously variable transmission fluid, an engine oil, a gear oil, or a hydraulic oil, comprising the lubricant composition of claim 11.

15. The copolymer of claim 1, wherein the copolymer is obtained by a method comprising copolymerizing a mixture of monomers comprising the one or more compounds of formula (I) and the one or more alkyl (meth)acrylates, and the method does not comprise grafting a monomer to a main chain of the copolymer formed by the copolymerizing.

16. The method of claim 10, wherein the method does not comprise grafting a monomer to a main chain of the copolymer formed by copolymerizing the mixture of monomers.

* * * * *